Oct. 18, 1960   P. E. CLINGMAN   2,956,705
CABINET FRAMEWORK
Filed Aug. 26, 1957

INVENTOR.
Paul E. Clingman
BY
His Attorney

United States Patent Office 2,956,705
Patented Oct. 18, 1960

2,956,705

CABINET FRAMEWORK

Paul E. Clingman, Dayton, Ohio, assignor to General Motors Corporation, Detroit, Mich., a corporation of Delaware Filed Aug. 26, 1957, Ser. No. 680,189

2 Claims. (Cl. 220—80)

This invention relates to an elastomeric connector device for supporting structural panel members or the like.

It is an object of this invention to provide an elastomeric connector strip capable of serving as a frame member and also sealingly supporting structural panel members in a non-parallel relationship. A further object of the invention is to provide a cabinet or like structure which includes panel members and connector strips forming a framework for sealingly connecting and supporting the panel members. These and other objects are accomplished by providing an elongated elastomeric element having a rigid reinforcing member incorporated therein and including channels adapted for sealingly and supportingly receiving the edges of channel members in a non-parallel relation and further including a wedge receiving groove intermediate the channels whereby the channels may be readily opened to receive the edges of panels and into which is compressibly inserted a wedge capable of crowding the elastomeric material of the connector element against the panel edges within the channels to sealingly and securely hold the panels in place.

In a preferred embodiment of the invention, the connector elements are joined to form a rectangular framework which forms the sole support for the panel members. In this embodiment, one of the channel walls of the connector element adjacent one side of the frame structure is modified to permit the insertion of the final panel in the formation of a completely enclosed receptacle.

Further objects and advantages of the present invention will be apparent from the following description, reference being had to the accompanying drawings, wherein preferred embodiments of the invention are clearly shown.

Figure 1:
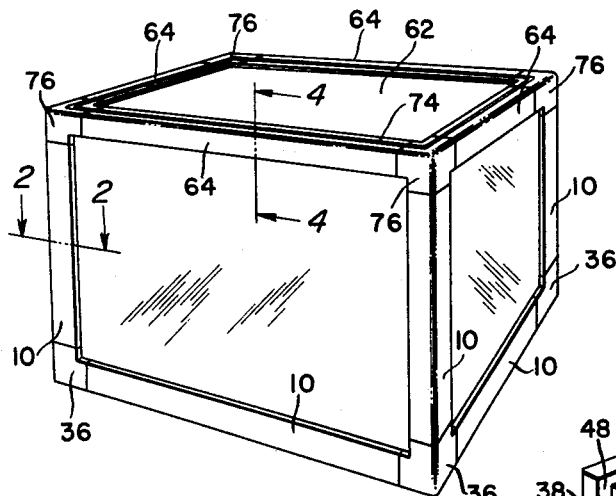
Fig. 1 is a perspective view of a cabinet made in accordance with the present invention.

The invention will now be described in terms of a completely enclosed cabinet as shown in Fig. 1 wherein the connector elements of the invention form a sole support for the panels or walls thereof.

Figure 2:
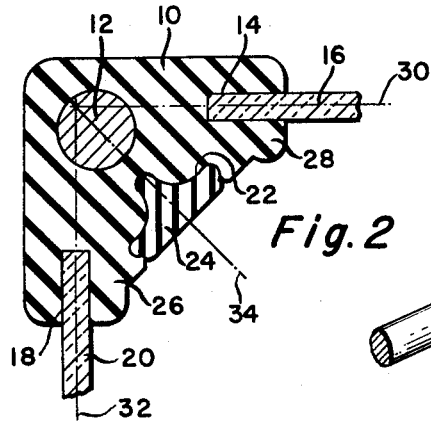
Fig. 2 is a cross sectional view of a connector element taken along line 2—2 of Fig. 1.

Referring to Fig. 2, the basic connector element of the invention consists of an elastomeric elongated element 10, preferably generally triangular in cross sectional shape, which includes a rigid, preferably metal, reinforcing member or rod 12 preferably extending coextensively with the length thereof.

The element further includes a first channel 14 adapted to receive the edge of for example a glass pane 16 and a second channel 18 adapted to receive the edge of a second glass pane 20, in a plane normal to the plane of the glass pane 16. Intermediate the channels 14 and 18 is a wedge receiving groove 22 adapted to compressibly receive an elastomeric wedge 24. When the wedge 24 is removed from the groove, it may readily be seen that the channel walls 26 and 28, adjacent the wedge receiving groove 22, may readily be bent back in the direction of the groove to permit efficient insertion of the panes or panels 16 and 20 into the respective channels. After insertion of the panel members, the wedge 24, preferably made of a relatively harder elastomeric material, is inserted in the groove 22 and is operative to crowd the elastomeric material of the channel walls 26 and 28 respectively, into tight sealing engagement with the panel members 16 and 20, respectively. Maximum strength and rigidity of an assembled structure such as is shown in Fig. 1 is achieved by arranging the element shown in Fig. 2 so that the planes 30, 32 and 34, shown in broken lines, of the channels 16 and 18 and the wedge receiving groove respectively, passing centrally thereof, intersect at a point located in the vicinity of and preferably within the space occupied by the reinforcing member 12.

In the manufacture of the connector element, the elastomeric portion of the strip 10 is preferably separately extruded so as to include an opening therethrough to receive the reinforcing member 12 after the extruded strip is cured. Thereafter the reinforcing member may be inserted within the opening. In an alternative method, the elastomeric portion of the connector element may be molded directly about the reinforcing member.

Figure 5:
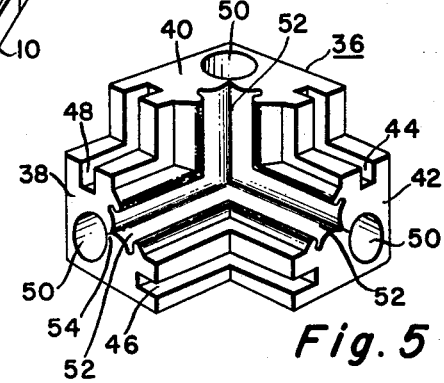
Fig. 5 is a perspective view of a corner connector element constructed in accordance with the present invention.

In the construction of a cabinet such as is shown in Fig. 1 wherein the connector strip of the present invention forms the sole framework, corner elements such as is shown in Fig. 5 are preferably provided for joining the connector elements 10 into a continuous rectangular framework. The corner element 36 may be regarded as consisting of three elements 38, 40 and 42 having the same cross-sectional shape as the member 10 of Fig. 2 which are joined together in a manner such that each element is disposed in a plane normal to the plane of the other two elements and continuous channels 44, 46 and 48, a continuous wedge receiving groove 52 and a continuous reinforcing member receiving opening 50 are formed.

Figure 6:
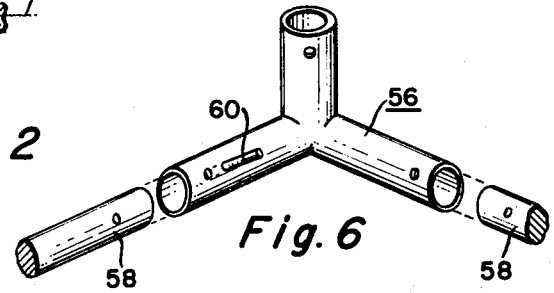
Fig. 6 is a perspective view of a reinforcing member for use with the corner element shown in Fig. 5.

In one method of forming the corner element 36, the elements 38, 40 and 42 are individually extruded, the ends thereof being suitably mitered and then adhesively joined. In this method, the elements 38, 40 and 42 are individually extruded so as to form the elastomeric portion 54 of the element between the base of the groove 52 and the opening 50 in a weakened condition whereby the portion 54 may be readily split so as to allow the insertion of a corner reinforcing member 56 as shown in Fig. 6 into the opening 50. Alternately the corner element 36 may be directly molded and the portions 54 subsequently split to receive the reinforcing member 56.

In assembling a cabinet such as is shown in Fig. 1, reinforcing rods 12 are provided in the connector element 10 which are somewhat longer than the connector strips to provide rod portions which extend beyond the ends of the element 10. The extended rod portions are illustrated in the exploited view of Fig. 6 as the elements 58 telescopically receivable within the corner receiving element 56 and secured therein by a pin 60 or other suitable means. In most cases a friction fit of these parts is sufficient. To facilitate the assembly of the rigid reinforcing members, particularly in the construction of relatively small structures wherein the reinforcing members may not be readily flexed, the ends of the rod 58 may be threaded and nuts may be associated with the ends of the corner reinforcing members which are advanced over the ends of the threaded rod 58 to secure the parts together without the need for flexing the reinforcing rods to effect an assembly thereof. In one method of assembling the parts, the connector elements 10 including the reinforcing rods 12 are assembled or telescoped into a rectangular framework interconnected by means of corner elements 56. Thereafter the elastomeric corner elements 36 are forced on to the corner elements 56 in an obvious manner, the portions 54 of the corner elements being split to permit this operation. Thereafter all of the panel members except the top or panel 62 (Fig. 1) are inserted within the appropriate channels and are secured therein by inserting the wedge in the wedge receiving groove.

Figure 4:
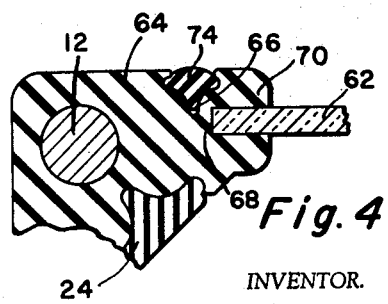
Fig. 4 is another modification of the strip shown in Fig. 2.

Since the assembly as above described is necessarily effected from the interior of the structure, a preferred modified form 64 of the connector element is provided for the uppermost connector element as shown in Fig. 4 which will permit an external insertion of the panel 62. The connector element 64 includes a second wedge receiving groove 66 disposed near to the base 68 of the upper channel so as to provide a relatively thin web which connects the outer channel wall 70 to the connector element 64, whereby the outer channel wall 70 may be readily bent back to receive the panel 62. After insertion, the panel 62 is firmly secured in place in an obvious manner by the insertion of the second wedge strip 74 within the groove 66. The uppermost corner elements 76 are preferably provided with a similar feature so as to effectively seal the panel 62 in place and provide the top of the structure with a neat and attractive appearance.

Figure 3:
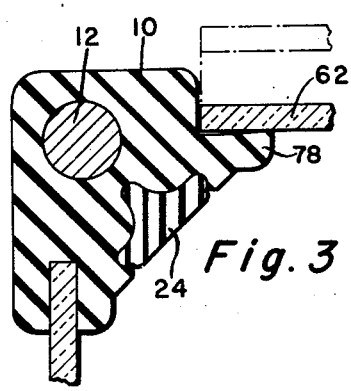
Fig. 3 is a modification of the strip shown in Fig. 2.

In a simpler construction of the uppermost connector element 64 as shown in Fig. 3, the upper channel wall is eliminated and the panel 62 is supported by the lower channel wall 78. The uppermost corner elements 76 for use with the embodiment of Fig. 3 are preferably correspondingly constructed.

Although the invention has been specifically described in terms of joining panel members in a plane normal to one another, it is readily apparent that the connector strips may be readily modified to join and support panel members in virtually any non-parallel relationship.

By the term "elastomeric" as used herein is meant any relatively elastic rubber-like material such as natural rubber, butadiene-styrene copolymers, butadiene-acrylonitrile copolymers, polychloroprene, polysulfide rubber and mixtures of these and other similar rubber-like materials.

While the embodiments of the present invention constitutes a preferred form, it is to be understood that other forms might be adopted.

What is claimed is as follows:

1. In a cabinet construction, the combination comprising; an exposed elastomeric framework having at least two longitudinally extending panel receiving grooves along longitudinal edges thereof disposed at 90° to one another and a wedge receiving groove intermediate said panel receiving grooves, said framework also including internal longitudinally extending openings therein, panels for forming the walls of said cabinet disposed with their edges in said grooves for holding the panels in predetermined position, a wedging strip of elastomeric material within said wedge receiving groove for crowding the elastomeric material of the framework into tight sealing relation with said panels, and a removable fully concealed rigid frame member positioned within said longitudinally extending concealed openings for stiffenng the elastomeric framework.

2. The cabinet as claimed in claim 1 wherein the rigid and removable frame member comprises a plurality of individual structural parts removably interlocked at corner portions with one another.

References Cited in the file of this patent

UNITED STATES PATENTS

| 936,451 | Havenhill | Oct. 12, 1909 |
| 1,961,352 | Hall | June 5, 1934 |
| 2,028,058 | Geyer | Jan. 14, 1936 |
| 2,609,071 | Morgann et al. | Sept. 2, 1952 |
| 2,655,239 | Kenlock | Oct. 13, 1953 |
| 2,815,105 | Dutfield | Dec. 3, 1957 |

FOREIGN PATENTS

| 594,543 | Great Britain | Nov. 13, 1947 |